(12) United States Patent
Robell (10) Patent No.: US 11,350,579 B2
(45) Date of Patent: Jun. 7, 2022

(54) CHARGED PLANT VESSEL FOR CONTROLLED NUTRIENT RELEASE

(71) Applicant: Maui Greens, Inc., Kula, HI (US)

(72) Inventor: Kevin Robell, Kula, HI (US)

(73) Assignee: MAUI GREENS, INC., Kula, HI (US)

( * ) Notice: Subject to any disclaimer, the term of this patent is extended or adjusted under 35 U.S.C. 154(b) by 237 days.

(21) Appl. No.: 16/852,043

(22) Filed: Apr. 17, 2020

(65) Prior Publication Data

US 2021/0321581 A1  Oct. 21, 2021

(51) Int. Cl.
*A01G 24/40* (2018.01)
*A01G 9/02* (2018.01)
*A01G 9/029* (2018.01)

(52) U.S. Cl.
CPC ............. *A01G 24/40* (2018.02); *A01G 9/022* (2013.01); *A01G 9/028* (2013.01); *A01G 9/0293* (2018.02); *A01G 9/0295* (2018.02)

(58) Field of Classification Search
CPC ........ A01G 24/40; A01G 24/50; A01G 9/029; A01G 9/0293; A01G 9/0295; A01G 1/00; A01G 31/02; A01G 27/00; A01G 27/005; A01G 27/006
See application file for complete search history.

(56) References Cited

U.S. PATENT DOCUMENTS

| | | | |
|---|---|---|---|
| 3,469,341 A * | 9/1969 | Bourget | A01G 9/0291 47/74 |
| 3,868,787 A * | 3/1975 | Wong, Jr. | A01G 31/02 47/62 R |
| 4,118,891 A * | 10/1978 | Kehl | A01G 24/44 47/59 R |
| 4,287,682 A * | 9/1981 | Browne | A01G 27/04 47/81 |
| 5,193,306 A * | 3/1993 | Whisenant | A01G 27/04 47/65.8 |
| 5,525,505 A * | 6/1996 | Young | A01H 4/001 435/430 |
| 5,927,007 A | 7/1999 | Oda et al. | |
| 6,253,488 B1 | 7/2001 | Murfin | |
| 2005/0005518 A1 | 1/2005 | Iseki et al. | |
| 2009/0223125 A1 | 9/2009 | Piccolo | |
| 2009/0241415 A1 | 10/2009 | Barghini | |
| 2011/0005131 A1 * | 1/2011 | Smits | A01G 7/02 47/79 |

FOREIGN PATENT DOCUMENTS

WO   WO-2017144904 A1 *  8/2017  ............. A01G 24/44

* cited by examiner

*Primary Examiner* — Kristen C Hayes
(74) *Attorney, Agent, or Firm* — Rowan TELS LLC (57) ABSTRACT

A plant growing vessel includes an impervious outer vessel, a cover, a first permeable membrane, a nutrient chamber, and a pocket. The impervious outer vessel includes an inert substrate in a root zone. The cover is positioned over the impervious outer vessel. The first permeable membrane is in contact with the inert substrate. The nutrient chamber includes solid nutrients. The nutrient chamber is between the cover and the first permeable membrane or between the first permeable membrane and a bottom of the impervious outer vessel, and the solid nutrients are in contact with the first permeable membrane. The pocket is configured to allow seeds, seedlings, or shoots of plants access to the inert substrate through an aperture in the cover.

20 Claims, 11 Drawing Sheets

CHARGED PLANT VESSEL FOR CONTROLLED NUTRIENT RELEASE

BACKGROUND

The inherent difficulties of growing, maintaining, and shipping large individual quantities of edible plant matter are sufficiently extensive that the field doesn't have a particularly strong record of innovation. Mistakes at any point in the growing, maintaining, and/or shipping process(es) often instantly lead to unusable products, with no possibility of recovery or regeneration. In short, the methods and apparatus for growing, maintaining, and shipping large individual quantities of edible plant matter impose requirements of precision wholly unknown in most other industries. Each individual stage for the methods and apparatus imposes its own separate challenges.

Individual plants, regardless of the scale at which they are grown and maintained, require more than soil, water, light, and nutrients, though all four are important. The locations of these components and the timing schedule at which they are delivered to a growing plant are additionally critical for plant growth.

Existing vessels for growing individual plants in large quantities exhibit several obstacles to successfully delivering packaged edible products. These obstacles include effectively delivering water and nutrients to the plants and controlling the climate conditions around the plant given the potential interactions between the plant and the growing medium as well as the interaction of the growing medium with the surroundings within the microclimate. Additional obstacles include protection against harsh handling when the plants are distributed, evaporation, effective watering of the growing medium, etc.

A need therefore exists for both a method and apparatus for storing, feeding, efficiently growing, and delivering individually secured and maintained edible plant products.

BRIEF SUMMARY

A plant growing vessel includes an impervious outer vessel, a cover, a first permeable membrane, a nutrient chamber, and a pocket. The impervious outer vessel includes an inert substrate in a root zone. The cover is positioned over the impervious outer vessel. The first permeable membrane is in contact with the inert substrate. The nutrient chamber includes solid nutrients. The nutrient chamber is between a wall of the impervious outer vessel and the first permeable membrane, and the solid nutrients are in contact with the first permeable membrane. The pocket is configured for allowing seeds, seedlings, or shoots of plants access to the inert substrate through an aperture in the cover.

A plant growing vessel includes an impervious outer vessel, a cover, a first permeable membrane, a nutrient chamber, and a pocket. The impervious outer vessel includes an inert substrate in a root zone. The cover is positioned over the impervious outer vessel. The first permeable membrane is in contact with the inert substrate. The nutrient chamber includes solid nutrients. The nutrient chamber is between the cover and the first permeable membrane or between the first permeable membrane and a bottom of the impervious outer vessel, and the solid nutrients are in contact with the first permeable membrane. The pocket is configured to allow seeds, seedlings, or shoots of plants access to the inert substrate through an aperture in the cover.

A method of growing seeds or seedlings is provided with a growing vessel. The growing vessel includes an impervious outer vessel, a cover, a first permeable membrane, a nutrient chamber, and a pocket. The impervious outer vessel includes an inert substrate in a root zone. The cover is positioned over the impervious outer vessel. The first permeable membrane is in contact with the inert substrate. The nutrient chamber includes solid nutrients. The nutrient chamber is between the cover and the first permeable membrane or between the first permeable membrane and a bottom of the impervious outer vessel, and the solid nutrients are in contact with the first permeable membrane. The pocket is configured for allowing seeds, seedlings, or shoots of plants access to the inert substrate through an aperture in the cover.

The method of growing seeds or seedlings involves planting the seeds or seedlings in the pocket and in contact with the inert substrate. Water is then injected into at least one of the nutrient chamber, the inert substrate, or combinations thereof. The shoots of the plants are then allowed to grow through the aperture.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

This disclosure is directed to a charged plant vessel for controlling nutrient release.

Existing vessels for growing individual plants in large quantities exhibit several obstacles to the successful delivery of packaged edible products. The location of nutrients (e.g., fertilizing matter to feed the plant supplementing access to soil, water and air) may be effectively sealed from the plant itself, as direct exposure to raw nutrients inhibit its growth. Water may be carefully and precisely fed to said nutrients, with an additional means for the water and nutrients to reach the inert substrate in which the plant roots grow. The vessels may be effectively standardized in shape and composition to allow predictable delivery as described. And finally, the entire vessel may be compostable, as re-use of the vessel may not be otherwise feasible given other constraints.

The primary identified problems and their solutions are related to the storing, feeding and growing a scalable number of plants. First, providing a permeable separation between a deposit of plant nutrients and an area where seeds are initially planted allows for precise amounts of said nutrients to be delivered to a plant or set of plants. Also, calibrating the amounts of water and nutrients needed by a scalable number of plants, keeping the plant shoots and nutrients physically separated, and providing a system that delivers water to plant nutrients, and an area where seeds are initially planted, or some combination thereof based on plant type and fertigation need, is provided by this disclosure.

The vessel containing the plants using such a method and apparatus utilizes two chambers, containing nutrients and inert substrate respectively, with a permeable membrane separation allowing water to transfer from one to the other. The vessel includes a means for water to be injected into its nutrient chamber in precisely measured quantities. The plant itself may be effectively shielded from the raw nutrients. The entire vessel may be a standardized shape to fit into a pallet module tray for a growing plant to be held in position for water, air and light delivery. Additionally, the vessel may be compostable.

Figure 1:
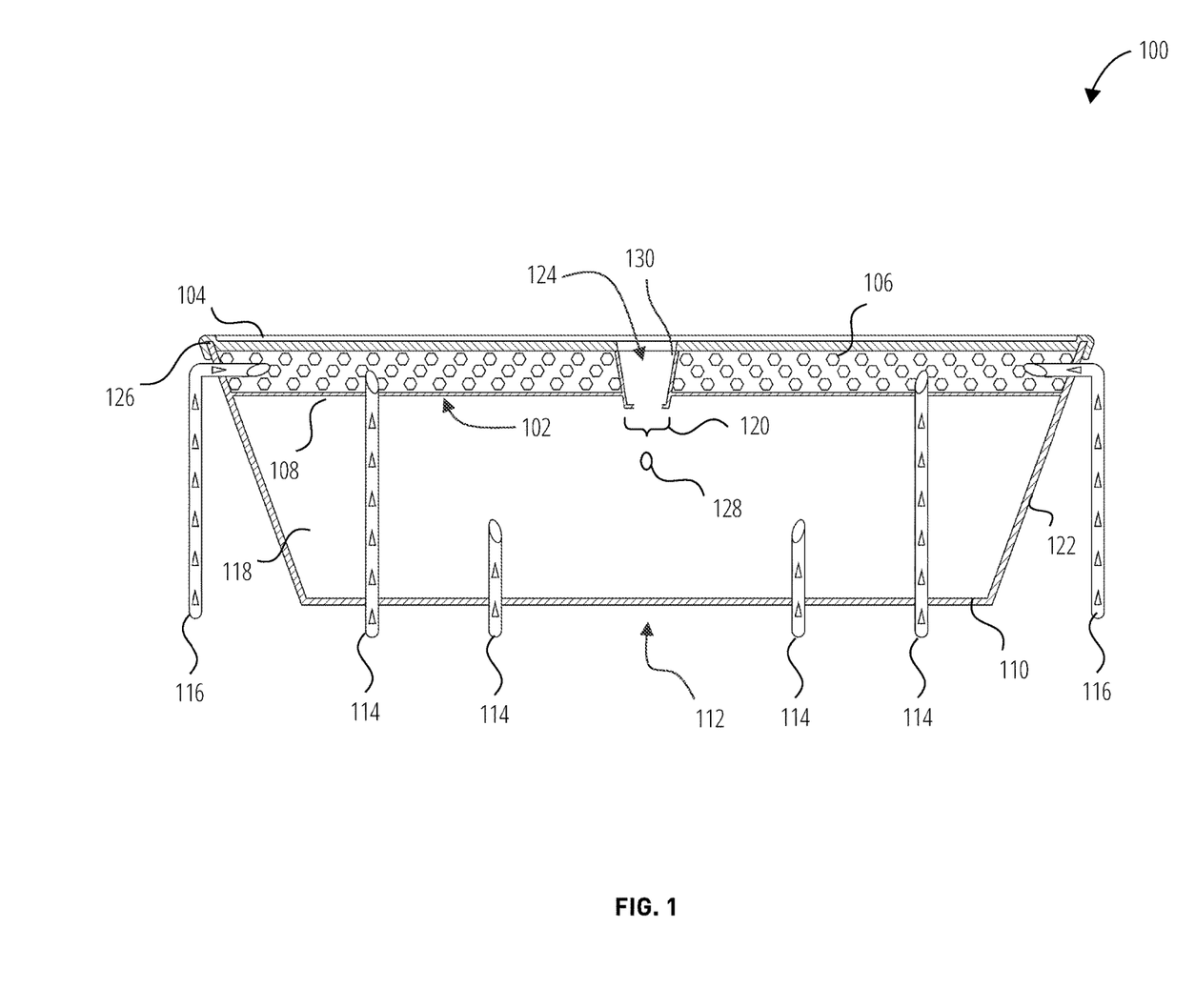
FIG. 1 illustrates a sectional view of a growing vessel 100 in accordance with one embodiment.

FIG. 1 illustrates a sectional view of a growing vessel 100. A growing vessel 100 comprises a cover 104 and an impervious outer vessel 112 with raw water nozzles 114 traversing into the impervious outer vessel 112. The impervious outer vessel 112 shows two stratified layers within its vertically oriented walls 122: an upper nutrient chamber 102 containing solid nutrients 106 and an inert substrate 118 layer containing a root zone and organic materials providing for the growth of seeds or seedlings. A permeable membrane 108 separates these two stratified layers, with its permeability gauged according to specific the specific plant type being grown. The permeable membrane 108 may be formed from a number of materials known to those skilled in the art, (e.g., membrane materials). The impervious outer vessel 112 additionally comprises a base 110 for the purpose of retaining excess water or inert substrate during transport or when individual growing vessels are installed within a fertigation system. The top of the nutrient chamber 102 comprises both a top rim 126 and a cover 104 forming a seal at the top rim 126 to ensure enclosure of the solid nutrients 106. The cover 104 contains a circular opening, a seed pocket 124, into which seeds or seedlings 128 are deposited into the inert substrate 118 through an aperture 120. Note the horizontal level of said aperture 120 is below the permeable membrane 108, ensuring that the deposited seeds or seedlings 128 avoid direct contact with the solid nutrients 106 in the nutrient chamber 102. The solid nutrients 106 within the nutrient chamber 102 are isolated from the seed pocket 124. A portion of the cover 130 separates the bottom portion of the pocket near the nutrient chamber 102 with an engagement to the permeable membrane 108. The engagement prevents the solid nutrients 106 from coming in contact with seeds or seedlings in the seed pocket 124.

Water may be added to the impervious outer vessel 112 through a plurality of nozzles. Fresh water (i.e., raw water) or water with other additives may be pumped through a plurality of nozzles puncturing the base 110 of the impervious outer vessel 112. The raw water nozzles 114 supply water to either the nutrient chamber 102 or inert substrate 118, depending on the fertigation needs of an individual plant or set of plants. In particular, plants in the form of seeds or seedlings 128, e.g., in early development stage, require water in the inert substrate 118 but not in the nutrient chamber 102 since the latter may be both unnecessary and potentially harmful until germination. Once the seeds or seedlings 128 have germinated and are ready to receive diluted solid nutrients, water passing through the raw water nozzles 114 enter the nutrient chamber 102 in precisely measured amounts calibrated to the type of plant or plants whose seeds or seedlings have germinated. The solid nutrients 106 mixed with water from the nozzles then pass through the permeable membrane 108 to enter the inert substrate 118 stratified layer and fertilize the germinated seeds or seedlings. The amount of permeability of the permeable membrane 108 is again calibrated to the type of plant or plants whose seeds or seedlings have germinated. In some configurations, A set of raw water nozzles 116 may be configured to enter the nutrient chamber 102 through the vertically oriented walls 122 in order to supply water to the nutrient chamber 102.

Injector, or injectors may penetrate the nutrient chamber and may deliver a precisely measured amount of raw water, or raw water with additives. In another embodiment, separately controlled injector or injectors may penetrate the root zone and deliver a precisely measured amount of raw water, or raw water with additives. The amount of fluid being injected into each zone may be independently controlled and may operate independently from one another. This individual control of whether or not liquid is delivered to either of the zones, and if so, in what amount, may provide the exponential requirements of plants pertaining to both hydration (root zone injections) and nutrients (food zone injections).

Growing Vessel

The growing vessel 100 (i.e., container) may be made of any appropriate material for facilitating storage of a plant and may be readily identified by persons of ordinary skill in the art. The basic requirements include the ability to isolate the root mass and inert substrate with a relative moisture barrier. It is also preferred that the growing vessel material be able to withstand minor impacts without breaching the barrier provided. Finally, materials are optimally chosen to avoid leaching of chemicals into the inert substrate.

In some embodiments, insulating materials are preferred for the growing vessel. For example, if known shipping conditions may expose the plants to drastic temperature fluctuations, an insulated growing vessel material may buffer the root mass and provide more stable temperature in the inert substrate. While it may be desirable to avoid extreme temperature increases during the day, the heat may be retained in the substrate into the cool of the night. Furthermore, an insulated material may reduce shock experienced with quick temperature fluctuations to which many plants are susceptible. Slower temperature changes help keep the turgor pressure of the plant steady and maintain nutrient uptake and overall plant health, whereas a rapid temperature change disrupts this pressure and slows or temporarily stays the uptake of the plant and results in poor development and health.

Exemplary, non-limiting materials for the growing vessel include appropriate plastics (e.g., polystyrene, polystyrene foam, or polypropylene) and cellulose (with optional water barrier), and the like. Growing vessel material may be sourced from plant-based materials to minimize environmental impact due to their biodegradability and renewability. For example, growing vessel material may be sourced from soy, corn, potato, soybeans, and the like.

In some embodiments, the plant growing vessel, in single modular form, may have an internal volume from about 5 to about 500 cubic inches, from about 5 to about 100 cubic inches, from about 10 to about 75 cubic inches, from about 10 to about 50 cubic inches, and from about 10 to about 25 cubic inches. In some embodiments, the plant growing vessel in single modular form has an internal volume of about 5, 7, 10, 15, 20, 25, 30, 35, 40, 50, 75, 100, 150, or 200 cubic inches.

As indicated above, the growing vessel assembly comprises a pliable cover substantially sealed against the growing vessel. Typically, the cover is substantially sealed against the top rim of the growing vessel. The sealing is typically completed after the inert substrate is placed into the interior space of the growing vessel. In some embodiments, the sealing is completed without a seed or plant part in the inert substrate. The seed or plant part may be inserted later through the aperture 120 in the cover 104.

The term "substantial seal" and grammatical variants thereof indicate that contact is maintained between the cover 104 and the growing vessel such that it substantially impedes air or vapor communication between the interior and exterior of the impervious outer vessel 112 to prevent non-transpiration water loss. In this regard, it is preferred that the majority of all water loss from the interior of the impervious outer vessel 112 be the result of plant transpiration (i.e., when the plant has a leaf mass on the exterior of the growing vessel) and not from evaporation and airflow between the interior space and the exterior. Use of "substantial" indicates that some evaporation or leaking is permitted, but the escape is slowed to maintain sufficient hydration within the inert substrate for a prolonged period of time. The sealing may be implemented according to any appropriate method known in the art, including use of heat sealing (to bond components together), gluing, or use of fasteners, such as clamps, elastic bands, and the like, to maintain a substantial seal.

The pliable cover 104 may have at least one aperture 120 that is sufficiently large to provide ambient light penetration into the interior space of the growing vessel such that the shoot extending from a germinating seed may extend upward through the aperture 120. However, the aperture may be sufficiently small to allow contact with the sides of the stem of the growing plant once it grows through the aperture 120. Thus, the aperture is smaller than the crown of the plant being produced when at its mature stage of growth. The contact between the stem and the aperture edge provides an additional seal to substantially prevent escape of humidity and, thus, preserve the hydration of the root mass while maintaining a lower humidity for the leaf mass.

The cover 104 is a pliable cover. The term "pliable" is used to indicate that the cover is flexible and may be moved or bent with the application of pressure. Typically, the cover 104 is overlaid on the growing vessel in a relatively taut configuration and sealed against the rim of the growing vessel, as described above. As the plant shoot/stem penetrates through the aperture, the edge of the aperture contacts the stem to create a seal by function of the pressure applied by the stem. As the stem grows and expands in diameter, the stem applies additional pressure on the edge of the aperture in the cover 104. Due to the pliability of the cover 104, the cover yields to the increased pressure applied by the growing stem and the aperture expands to accommodate the increased stem width. Preferably, the pliability is such that the seal is maintained while not significantly impeding the growth of the stem.

The nature of the material used for the cover 104 may, in some degree, be determined by a person of ordinary skill in the art considering the specific plant variety of plant produced and stored in the growing vessel. The weight and composition of the membrane material must be strong enough to stay adhered to the growing vessel and withstand the elements during storage/transport and growth of the plant. However, the cover 104 may be pliable enough to allow the crown/stem of the plant to stretch and displace it while maturing (as described above). Accordingly, a person of ordinary skill may be able to determine the most appropriate cover for the target application.

Exemplary cover materials include sheets of plastic, foil, and the like. Illustrative, non-limiting examples of cover materials include: polystyrene, polypropylene, foil and metallic materials, plant-based polymers (e.g., sourced from corn, potato, soybeans, and the like). The membrane may be any degree of opacity. In some embodiments, the cover material is capable of receiving print or embossing to accommodate branding or other markings.

In some embodiments, the cover 104 is substantially planar. However, in some embodiments, the cover may have some topography configured to permit air to circulate in channels even if a planar leaf is disposed against the cover. For example, pronounced embossing of the membrane material, such as foil, capable of holding its embossed pattern, may create channels of airflow by creating separation from a contacting leaf. The channels prevent the decay of leaves that contact the membrane for extended periods of time during the production and distribution process. While the leaves may not require significant ventilation, the air channels prevent leaf suffocation due to lamination of the flat surface of the leaves to the flat surface of a flat membrane. A certain variation of texture of this membrane that created enough separation between the leaves and membrane, even if just a "course" texture, or channeling, may suffice to prevent this suffocation and decay, for extended periods of time.

The number of apertures and the size of the apertures may vary depending upon the variety of product being produced. In some embodiments, the at least one aperture in the cover 104 ranges from about 1/16 inch to about 3/8 inch, depending upon the variety being produced.

The number and spacing of multiple apertures also depend upon the variety of the product and the end product desired. Micro greens, edible flowers and nutritional grasses may grow better with a frequency of up to about 30-40 apertures per square inch in the cover. In contrast, plants with small leaf mass per seed, such as spinach, may grow better with about 1-5 apertures per square inch, such as 1-2 apertures per square inch, to achieve the foliage density required. Heading lettuces typically require only one aperture in the center of the growing vessel, unless a mix or blend of lettuces in a single growing vessel is desired.

In some embodiments, the growing vessel assembly contains a mix of multiple plant types (e.g., lettuces). For example, in the embodiment with multiple lettuce varieties, about 3-5 apertures may be placed evenly around the near perimeter of the membrane. The different varieties of lettuce are placed in these apertures, resulting in a single growing vessel with a mix of living lettuce/greens in a single product. The benefits of this specific embodiment for the producer is that this "mixed" product is produced in a much shorter time frame as the goal is to realize 3-4 petite products, requiring only 20-30 days of growing time as opposed to a single variety of lettuce requiring up to 50 days in the system in order to reach full size. The benefits to the consumer is that one may otherwise have to purchase 3-4 separate products in order to realize this mix, or be confined to purchasing a "cut" mixed product of compromised freshness, longevity, appearance, and nutritional value.

Previous Membrane

The permeable membrane may be made of any material that allows nutrients and water to flow through but allows the separation of the solid nutrients from the inert substrate.

Nutrient Chamber

The nutrient chamber may include solid nutrients of any variety that is beneficial for a specific type of plant. Examples include nitrogen, phosphorus, potassium, and calcium, but are not limited thereto.

The nutrient chamber may be constructed by creating seals between the permeable membrane and the cover, both at the outer diameter near the portion of the cover applied to the top rim, and around the pocket portion of the cover. Solid nutrients may be added before either seal is created, thereby forming the nutrient chamber.

In another embodiment, the nutrient chamber may be formed by starting with a pillow shaped chamber with one side constructed of cover material and the other side constructed of permeable membrane material, filled with solid nutrients, that is sealed around its circumference and is approximately the same size as the top rim of the growing vessel. A center portion of the permeable membrane is sealed to the center portion of the cover material to create the pocket (without an aperture). In an embodiment, the pocket is formed and an aperture inside the pocket is made as part of the sealing process.

Inert Substrate

The composition of the inert substrate 118 (i.e., growth medium) may be determined by the known requirements of the plant or plants being cultivated in the growing vessel. For example, different compositions of soils are known for applications in cultivating a wide variety of edible and ornamental plants and may be readily and appropriately chosen by persons of ordinary skill in the art.

The inert substrate may also comprise the additions of fertilizers, nutrient additives, mineral supplements, beneficial commensal microorganisms, and the like, to optimize the growth conditions. Additionally, if so desired, the inert substrate may also comprise effective amounts of pesticides, selective herbicides, fungicides or other chemicals to remove, reduce, or prevent growth of parasites, weeds, pathogens, or any other detrimental organisms. The formulation of nutrient recipes for the inert substrate may be adjusted as appropriate for the variety of the plant produced and shipped. In some embodiments, the nutrient formulation may be modified by augmenting or even reducing specific minerals to optimize and regulate the growth rate of the plant within the packaging, and maintain or enhance the color of the plant. To illustrate, if a basil plant is suddenly placed in a dark environment for an extended period of time, the plant may initially accelerate its growth rate in an attempt to "reach" for and regain the sunlight it no longer receives. This type of rapid growth is problematic for packaged plants because it exhausts the energy and nutrient stores of the plant. Specific mineral recipes may reduce or slow this growth spurt during the storage conditions, thus preserving and promoting long-term vibrancy of the plant. In addition, nutrient formulations may be routinely adjusted to promote keeping color and crispness while plant is packaged and in transport.

Optimized choice and assembly of the inert substrate may thus be based on various considerations of the plant being cultivated. A brief discussion of considerations is provided. First, different varieties of plants have different root structures within the growing vessel. The size (length and girth) of "mature" roots may occupy a large portion of the "limited" space within the growing vessel. This requires the use of an absorbent and expansive material within the substrate to temporarily expand and occupy the substantial volume within the growing vessel during germination. When at germination or early in the growth phase, the growing vessel volume is preferably filled mostly with substrate in order to support the seed or young plant mass near the top and aperture of the membrane. The substrate is also ideally stable, minimized voids or shifting, to ensure that the seed/seedling remains stable and in its position at or near the aperture for a sufficient time to allow for germination extension of the stem through the aperture and for the roots to penetrate into the substrate. As the roots increase in quantity and size, they must be able to "displace" this originally expanded material and utilize the volume of area that the expandable material was occupying. This allows the roots to fully mature and develop without becoming root bound and compressed too tightly within the growing vessel.

Second, nitrogen, phosphorus, and calcium are nutrients that contribute to rapid growth cycles of many plant varieties of interest. Many plant varieties typically require large amounts during their rapid growth cycle. These nutrients may not be "organically" sourced for water in water-soluble methods of growing and are not compliant with the NOP (National Organic Program) and USDA. This means that "Organic Certification" as a hydroponic facility is not possible. To overcome this limitation, and to facilitate organic certification, calculated amounts of approved "organic" nitrogen, phosphorus and calcium nutrients may be included in the inert substrate. However, to avoid problems of "nutrient toxicity", i.e., burning from the intense sources of concentrated fertilizers, while still providing sufficient sources of nitrogen, phosphorus and calcium, the organic sources may be preprocessed prior to incorporation. This preprocessing entails exposure to relevant microbial activity before they are added. The exact quantities of the desired nutrients are calculated for the full growth and expression of the subject plant. The source nutrients are initially provided in compressed, pelleted form. The pellets are introduced to a small colony of beneficial bacteria within this substrate combination. As the microbial activity commences, the colony of bacteria is small and thus processes a small amount of the organic nutrients. As this processing continues, the byproducts of this microbial-driven breakdown are now able to be taken up by the plants' roots. As time goes on, the colony of bacteria and microbial activity increases, resulting in more and more nutrients being made available to the plant roots. Because the reproduction of this microbial colony is exponential, so is the processing and availability of the nutrients. This process results in a controlled time release of absorbable forms of the nutrients. This process prevents nutrient toxicity in the beginning stages of the plants' development, and provides amounts of absorbable nutrients commensurate with the growing demand of the growing plant, including in the final trimester of growth when the demands are highest. This process is critically essential to the success of growing fully expressed plants in exceptionally small and sealed growing vessels.

Third, considering that the growing vessel is sealed, the only source of additional oxygen to the root system is by way of introducing the water for hydration. Oxygen is contained in or on the surface of the water and is carried to the plant roots. If this oxygen level is insufficient, organically approved oxidizing agents may be added to the substrate to promote further oxygenation in the root zone.

In some embodiments, the inert substrate further comprises a thickening agent. The thickening agent creates an effect that is similar to a naturally occurring event in the plant's life. When the end of a growing season is nearing, the plant may experience certain environmental signals that induce the plant to produce latex. The environmental signals are often based on increasing scarcity of resources. For example, the length of day shortens, sunlight intensity reduces, hydration might reduce, or food for the plant is scarce. Latex in a lettuce plant, for example, is thicker than water and very bitter in taste. The plant produces this latex to slow circulation and, thus, slow the perishing process and extend its life long enough for the plant to quickly go to seed and flower for self-preservation of the species. Like natural latex, the thickening agent slows the plant's transpiration rate and, thus, slows the plant's uptake of water from the inert substrate during the prolonged period of storage in the growing vessel assembly. Furthermore, the metabolism and growth is correspondingly slowed and, thus, conserves nutrients. This effective "rationing" of water maintains the moisture level in the inert substrate for a longer period of time and prevents the plant from exhausting the life supporting resources during shipping. This extends resiliency of the plant during storage of and improves the final product in the marketplace.

Exemplary, non-limiting thickening agents include agar and gelatin-based products.

Agar-agar is a vegan based gelatin, made from algae. Agar-agar may be used, depending on the shelf life extension desired, with certain varieties of produce. By mixing this gelatin in water, with a specific ratio, one may manipulate the viscosity of water (with or without nutrients). By increasing the viscosity (slightly thickening the water to a mild gelatin-like substance), the circulation of water throughout the plant slightly coagulates and slows. This slows the uptake of this moisture by the plant. It also slows the transpiration (moisture emitted from leaf surface) of the plant. By doing so, the moisture in the growing vessel lasts longer, as the plant is using it more slowly.

While not all varieties require the use of a thickening agent, or agar-agar, it may be included for most plants at various concentrations depending upon the desired shelf life and expected environmental conditions likely to be experienced during distribution and subsequent display. To illustrate, a single lettuce plant and variety in a six-ounce growing vessel may contain four-five ounces of hydration. In this example, one-two parts agar-agar to 99-98 parts water (respectively), is beneficial for maintaining long term vibrancy of the lettuce. A person of ordinary skill in the art may further optimize the concentration and water content relative to the inert substrate depending on the plant variety and intended use.

Figure 2:
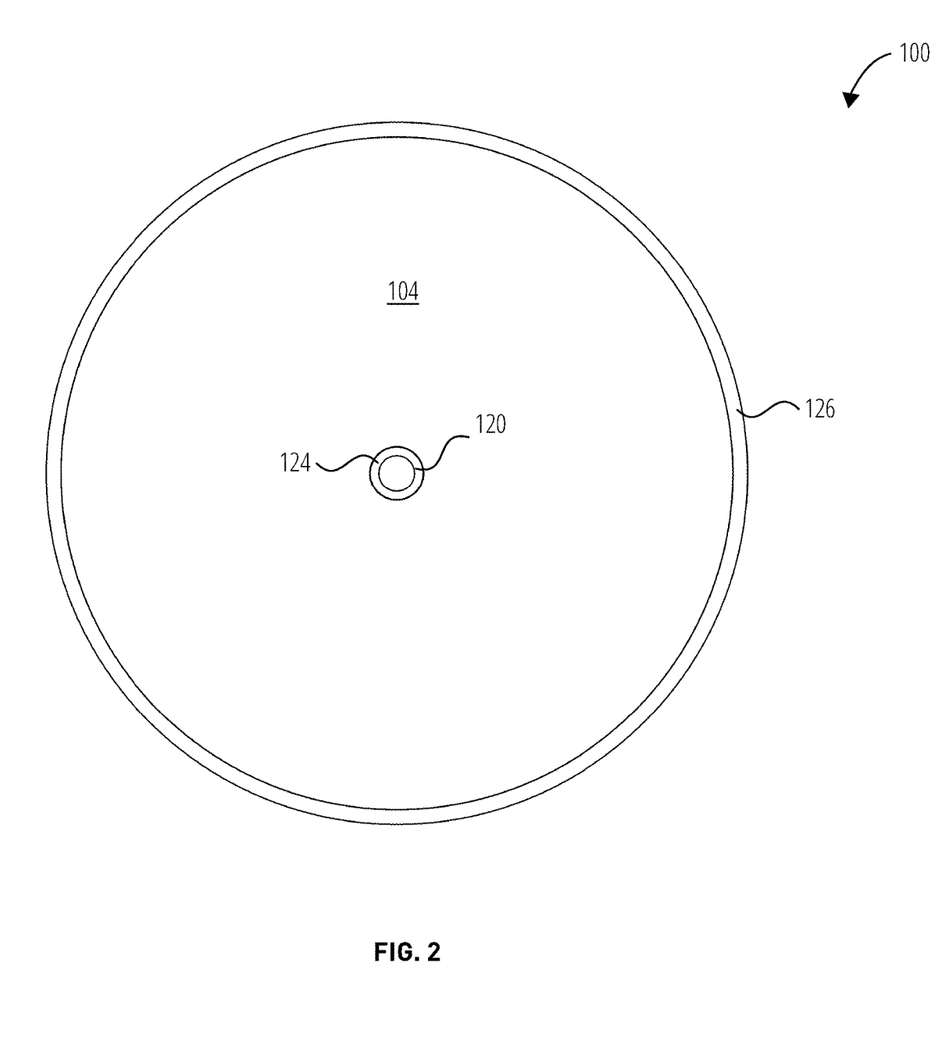
FIG. 2 illustrates a top view of the growing vessel 100 in accordance with one embodiment.

FIG. 2 illustrates a top view of the growing vessel 100. The cover 104 is shown as being circular in shape and engages the top rim 126 of the impervious outer vessel 112. The engagement of the cover 104 with the top rim 126 encases the solid nutrients in the uppermost stratified layer of the impervious outer vessel. At the center of both the cover 104 an underlying top rim 126, a seed pocket 124 forms a circular cutout in the center of both the top rim 126 and cover 104. At the base of the seed pocket 124, an aperture 120 provides an opening through which a growing plant forms a seal preventing the solid nutrients in the nutrient chamber from harming the seedlings or shoots of plants growing up through the seed pocket 124.

Figure 3:
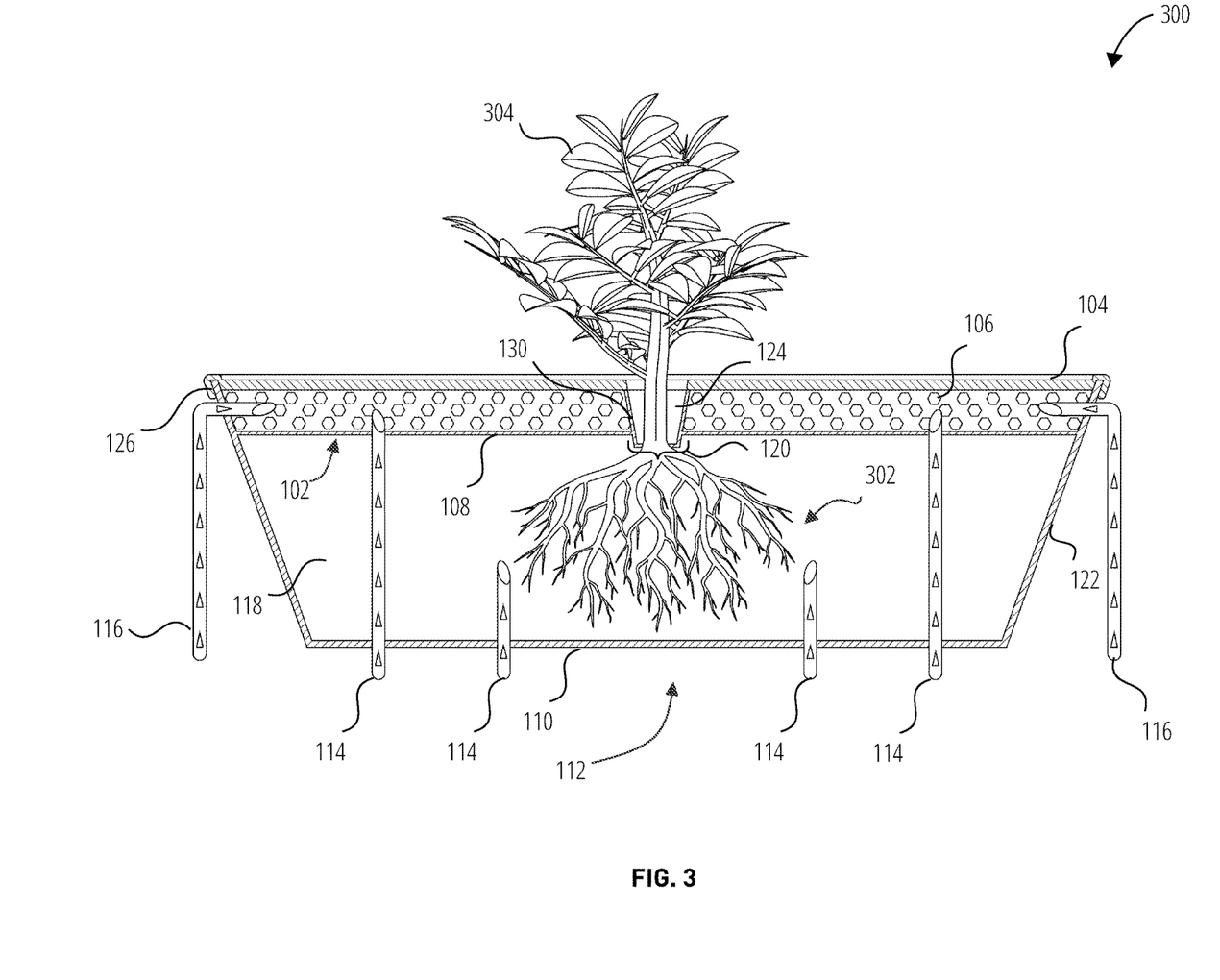
FIG. 3 illustrates a sectional view of a growing vessel 300 in accordance with one embodiment.

FIG. 3 illustrates a sectional view of a growing vessel 300 with a plant 304 growing from the inert substrate 118. The growing vessel 300 is a configuration of the growing vessel 100 with a plant 304 having grown from a seed or seedling. As such the growing vessel 300 comprises the components of the growing vessel 100. The growing vessel 300 comprises an impervious outer vessel 112 and a cover 104. The impervious outer vessel 112 comprises a base 110, vertically oriented walls 122, a top rim 126, and a seed pocket 124. The cover 104 comprises an aperture 120. Inside the impervious outer vessel 112, the nutrient chamber 102 is separated by a permeable membrane 108. A plurality of nozzles, such as raw water nozzles 114, are shown traversing the impervious outer vessel 112 by way of the base 110 to feed water to the nutrient chamber 102, the inert substrate 118, or some combination of the two during a fertigation process. In some configurations, a plurality of nozzles, such as raw water nozzles 116, may traverse the impervious outer vessel 112 through the vertically oriented walls 122, entering the nutrient chamber 102. The raw water nozzles 116 may be utilized as an alternative to or in combination with the raw water nozzles 114.

In the growing vessel 300, the plant 304 is shown with an established a root system in a root zone 302 within the inert substrate 118. The body of the plant 304 (e.g., stalk, leaves, etc.) is shown having grown through the aperture 120 and the seed pocket 124. A seal is formed at the aperture 120 after the plant 304 pushed itself through the aperture 120 into the seed pocket 124 and further extends its growth above the impervious outer vessel 112. This seal prevents the plant 304 from being damaged from direct contact with the solid nutrients 106 in the nutrient chamber 102.

Figure 4:
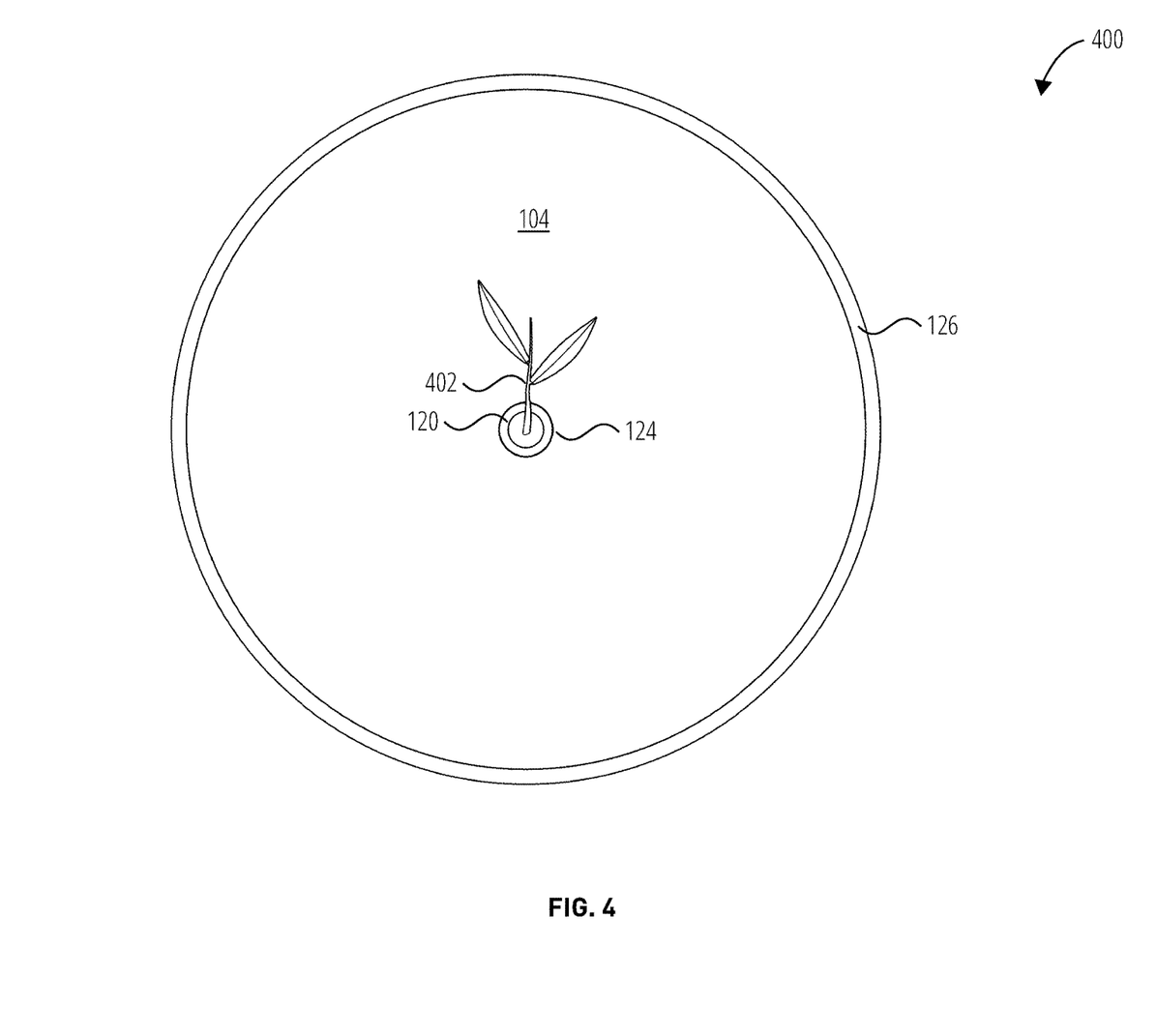
FIG. 4 illustrates a top view of the growing vessel 300 in accordance with one embodiment.

FIG. 4 illustrates a top view of the growing vessel 400 with a plant 402 growing through an aperture 120 and a seed pocket 124. The growing vessel 400 is a configuration of the growing vessel 100 and comprises the same features and configurations. The plant 402 is a seedling that has grown through the aperture 120 and the seed pocket 124. The leaves of the plant 402 are shown growing above the cover 104.

Figure 5:
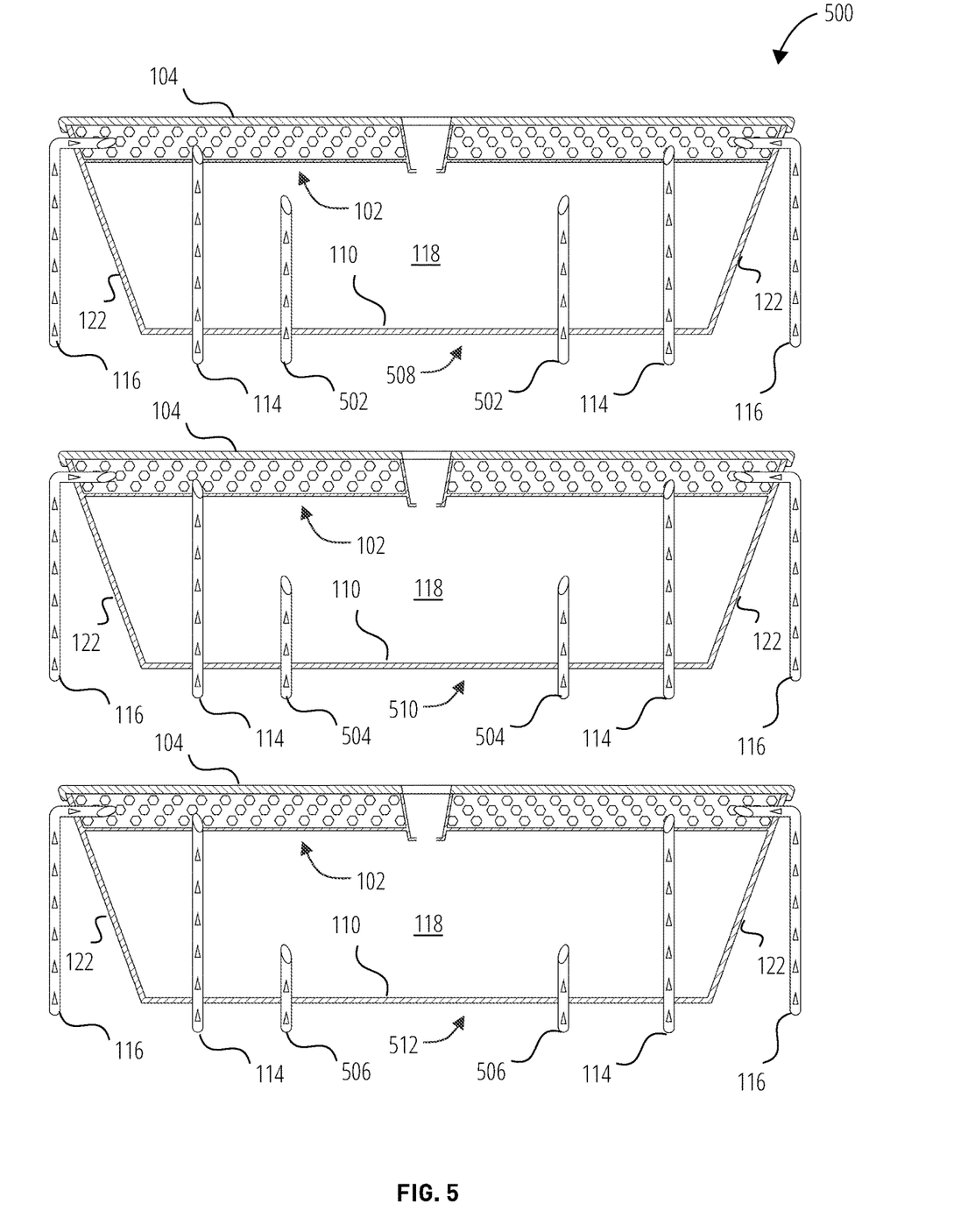
FIG. 5 illustrates sectional view of growing vessels 500 in accordance with one embodiment.

FIG. 5 illustrates sectional views of growing vessels 500 showing the different depths for the raw water nozzles in the inert substrate. impervious outer vessel 508, impervious outer vessel 510, and impervious outer vessel 512 are provided with the different depth configurations for the raw water nozzles. The impervious outer vessel 508, the impervious outer vessel 510, and the impervious outer vessel 512 each comprise a nutrient chamber 102, a cover 104, a base 110, an inert substrate 118, vertically oriented walls 122, raw water nozzles 114, and raw water nozzles 116. The nutrient chamber 102 is positioned adjacent to the cover 104 above the inert substrate 118. The base 110 is positioned opposite the cover 104 across the inert substrate 118. The raw water nozzles 114 traverse the base 110 and the inert substrate 118 to enter the nutrient chamber 102 to provide water to the solid nutrients. In some configurations, the raw water nozzles 116 enter the nutrient chamber 102 through the vertically oriented walls 122 to provide water.

The impervious outer vessel 508, the impervious outer vessel 510, and the impervious outer vessel 512 differ in the depths of raw water nozzles within the inert substrate 118. In the impervious outer vessel 508, the raw water nozzles 502 are positioned proximal to the nutrient chamber 102. This positioning for the raw water nozzles 502 may be useful for providing water to plants with high water demands and/or unestablished root systems.

In the impervious outer vessel 510, raw water nozzles 504 are positioned in the middle of the inert substrate 118 between the nutrient chamber 102 and the base 110. The positioning of the raw water nozzles 504 may be provided for plants with roots systems with different water delivery needs such as plants with established root systems or plants whose roots have not grown below the positioning of the raw water nozzles 504.

In the impervious outer vessel 512, raw water nozzles 506 are positioned adjacent to the base 110. The positioning of the raw water nozzles 506 may be provided for plants certain water delivery needs or different growth conditions. The raw water nozzles 506 may be utilized with plants with established roots systems that have grown beyond the areas where the raw water nozzles 502 and the raw water nozzles 504 are positioned.

Figure 6:
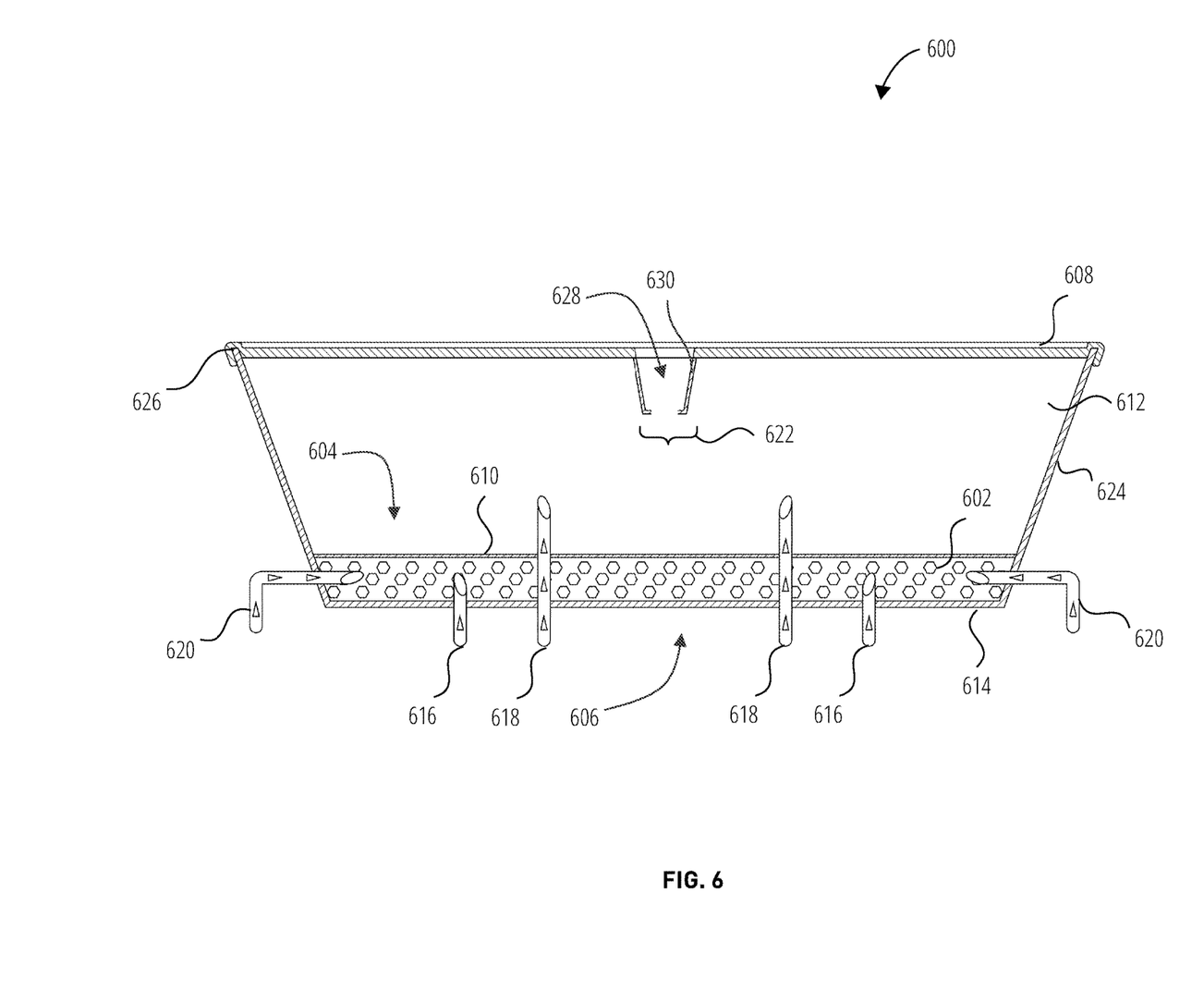
FIG. 6 illustrates a sectional view of a growing vessel 600 in accordance with one embodiment.

FIG. 6 illustrates a sectional view of a growing vessel 600 with a nutrient chamber 604 positioned adjacent to the base 614 of the impervious outer vessel 606. The growing vessel 600 comprises an impervious outer vessel 606 with an attached cover 608. The impervious outer vessel 606 comprises a vertically oriented walls 624, a base 614, an inert substrate 612, and a nutrient chamber 604.

The cover 608 engages the impervious outer vessel 606 through a top rim 626. The cover 608 encloses the inert substrate 612 but leaves open a seed pocket 628 surrounded by a portion of the cover 630. The seed pocket 628 is the entry point for depositing a seed or seedling into the growing vessel 600. The seeds or seedlings enter the inert substrate 612 through an aperture 622 at the bottom of the seed pocket 628.

The nutrient chamber 604 is positioned adjacent to the base 614 below the inert substrate 612. The nutrient chamber 604 comprises solid nutrients 602 that are separated from the inert substrate 612 through a permeable membrane 610. The solid nutrients 602 in the nutrient chamber 604 may receive water from raw water nozzles 616 that enter the impervious outer vessel 606 through the base 614 and are operatively positioned within the nutrient chamber 604. The inert substrate 612 may also receive water from raw water nozzles 618 that traverse the base 614 and the nutrient chamber 604 to position the tips of the raw water nozzles 618 within the inert substrate 612. The raw water nozzles 618 may be positioned at different depths within the inert substrate 612 depending on the needs of the plants being grown. In some configurations, raw water nozzles 620 may be operatively positioned within the nutrient chamber 604 by traversing the vertically oriented walls 624 into the nutrient chamber 604.

Figure 7:
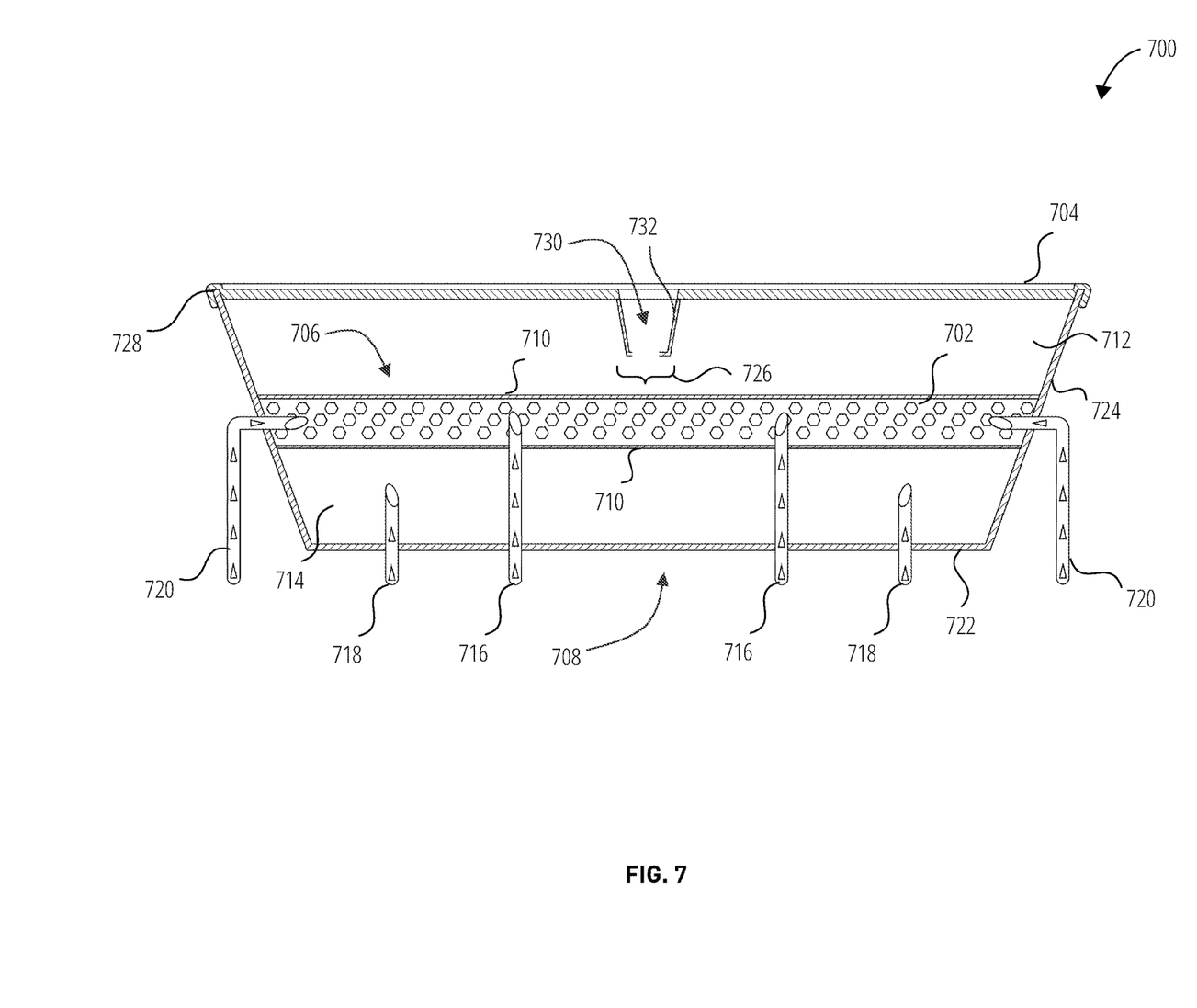
FIG. 7 illustrates a sectional view of a growing vessel 700 in accordance with one embodiment.

FIG. 7 illustrates a sectional view of a growing vessel 700 with a nutrient chamber 706 positioned in the middle of the impervious outer vessel 708 between the base 722 and the cover 704. The growing vessel 700 comprises an impervious outer vessel 708 coupled to a cover 704. The impervious outer vessel 708 comprises a vertically oriented walls 724, an inert substrate 712, an inert substrate 714, nutrient chamber 706, vertically oriented walls 724, and a base 722. The cover 704 engages the impervious outer vessel 708 through a top rim 728 on the vertically oriented walls 724. The cover 704 encloses the inert substrate 712, the nutrient chamber 706, and the inert substrate 714 within the impervious outer vessel 708. The cover 704 forms a seed pocket 730 for receiving seeds or seedlings within the inert substrate 712. The seed pocket 730 includes a portion of the cover 732 that forms the walls of the pocket with an aperture 726 positioned on the bottom allowing the seeds or seedlings to interact with the inert substrate 712.

The nutrient chamber 706 is positioned between the inert substrate 712 and the inert substrate 714. The nutrient chamber 706 comprises solid nutrients 702 that are separated from the inert substrate 712 and the inert substrate 714 through a permeable membrane 710. The nutrient chamber 706 receives water from raw water nozzles 716 that traverses the base 722, the inert substrate 714, and the permeable membrane 710 adjacent to the inert substrate 714 to enter the nutrient chamber 706. Raw water nozzles 718 may be positioned within the inert substrate 714 entering the impervious outer vessel 708 through the base 722 to deliver water within the inert substrate 712. In some configurations, raw water nozzles 720 may enter the nutrient chamber 706 through the vertically oriented walls 724 to provide water to the solid nutrients 702. In some configurations, raw water nozzles may provide water to the inert substrate 712 through by traversing the vertically oriented walls 724 into the inert substrate 712. In some configurations the raw water nozzles 718 may be configured to traverse the inert substrate 714 and the nutrient chamber 706 to provide water to the inert substrate 712.

Figure 8:
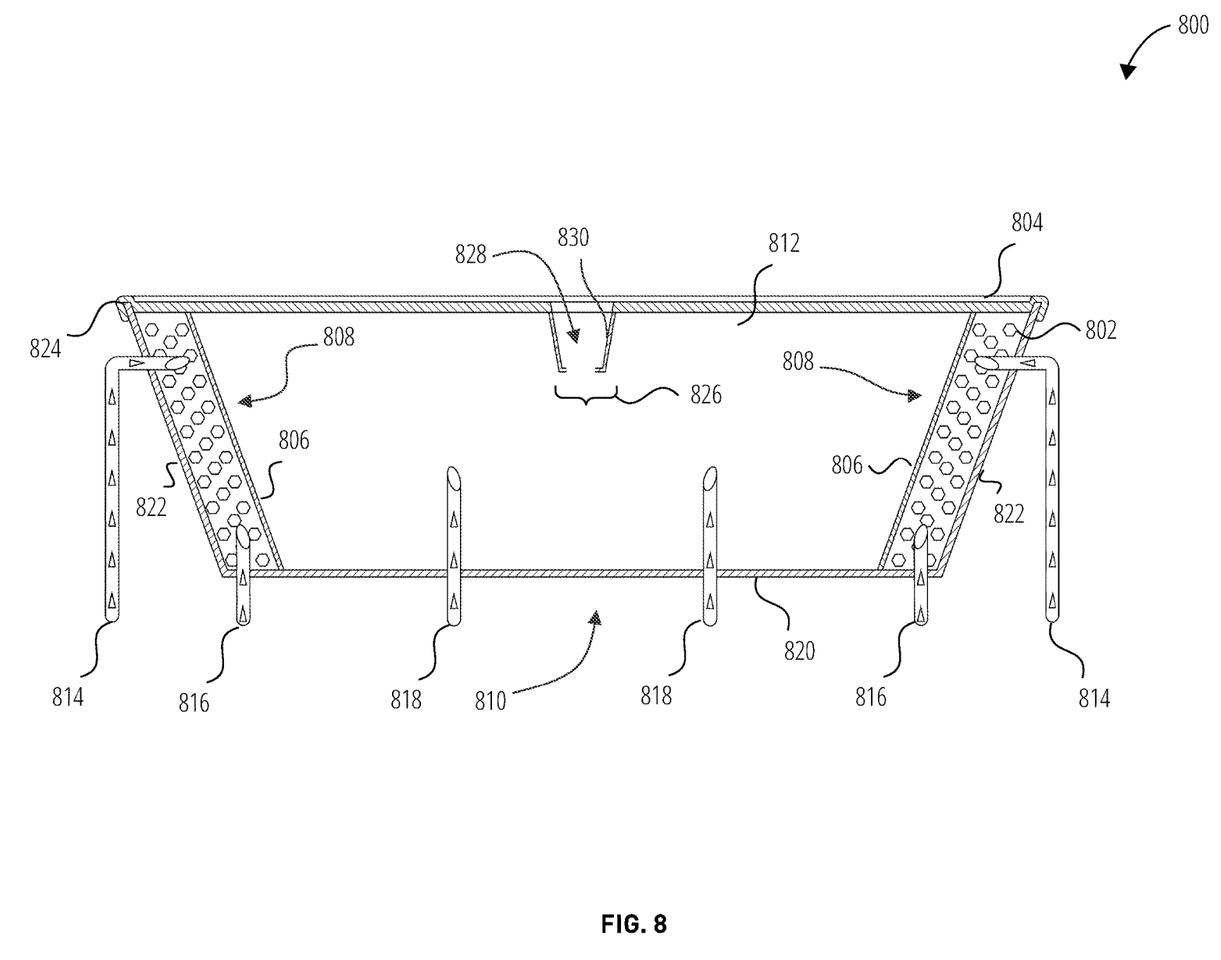
FIG. 8 illustrates a sectional view of a growing vessel 800 in accordance with one embodiment.

FIG. 8 illustrates a sectional view of a growing vessel 800 with a nutrient chamber 808 radially positioned around an inert substrate 812 within an impervious outer vessel 810. The growing vessel 800 comprises an impervious outer vessel 810 coupled to a cover 804. The impervious outer vessel 810 comprises vertically oriented walls 822, a nutrient chamber 808, an inert substrate 812, and a base 820. The cover 804 engages the impervious outer vessel 810 through a top rim 824 of the vertically oriented walls 822. The cover 804 forms a seed pocket 828 for receiving seeds or seedlings within the impervious outer vessel 810. The seed pocket 828 is surrounded by a portion of the cover 830 with an aperture 826 provided for seeds or seedlings to access the inert substrate 812.

The growing vessel 800 is configured with a radially positioned nutrient chamber 808 positioned adjacent to the vertically oriented walls 822 surrounding the inert substrate 812. The nutrient chamber 808 may extend from the top rim 824 to the base 820 of the impervious outer vessel 810. The nutrient chamber 808 comprises solid nutrients 802 separated from the inert substrate 812 through a permeable membrane 806. The nutrient chamber 808 may receive water from raw water nozzles 816 that enter the nutrient chamber 808 by traversing the base 820. The inert substrate 812 may receive water from raw water nozzles 818 that enter the inert substrate 812 through the base 820. The depth of the raw water nozzles 818 may depend on the needs of the plants growing within the impervious outer vessel 810. In some configurations, raw water nozzles 814 may enter the nutrient chamber 808 through the vertically oriented walls 822 to provide water to the solid nutrients 802.

Figure 9:
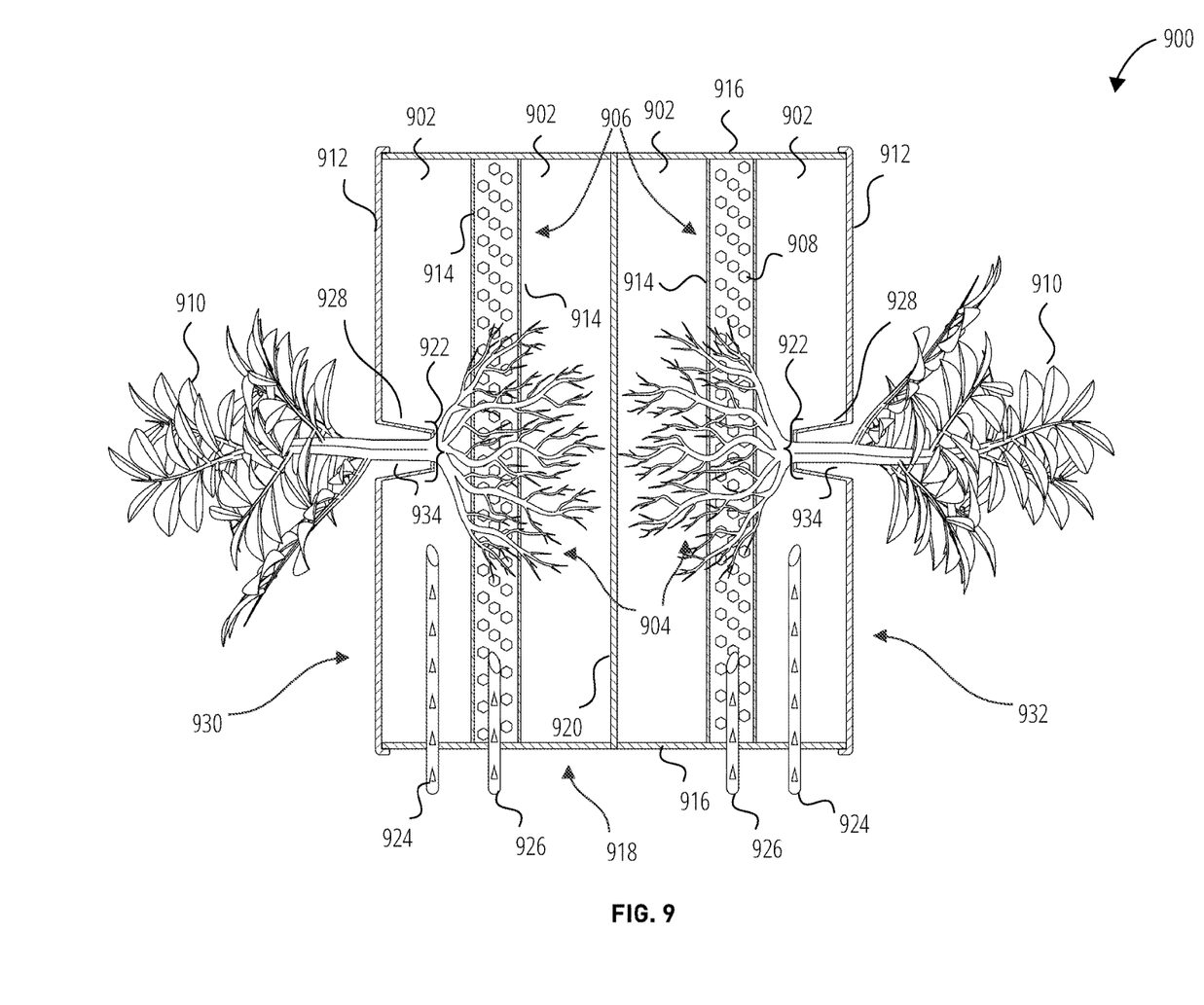
FIG. 9 illustrates a sectional view of a growing vessel 900 in accordance with one embodiment.

FIG. 9 illustrates a sectional view of a growing vessel 900 showing a dual sided vertical configuration of a growing vessel with two growing areas separated by an impervious wall (partition 920) and nutrient chambers positioned in the middle of the inert substrate of each growing area. The growing vessel 900 comprises an impervious outer vessel 918 with two growing areas (growing area 930 and growing area 932. The growing vessel 900 comprises an impervious outer vessel 918 with two cover 912 enclosing a growing area 930 and a growing area 932. The impervious outer vessel 918 comprises two growing areas growing area 930 and growing area 932 separated by a partition 920, lateral wall 916, inert substrate 902, and two nutrient chambers 906. The cover 912 engages the lateral wall 916 and enclose the growing area 930 and the growing area 932. The cover 912 form a seed pocket 934 with a portion of the cover 928 surrounding an area where seeds or seedlings may be positioned for growing. An aperture 922 may be positioned centrally in the seed pocket 934 allowing the seeds or seedlings enter the inert substrate 902 to establish roots.

In the growing vessel 900, plants 910 have grown through the seed pocket 934 and out the side of the impervious outer vessel 918. The plants 910 comprise a root zone 904 within the growing area 930 and the growing area 932.

The nutrient chambers 906 are positioned in the inert substrate 902 between the partition 920 and the cover 912. The nutrient chambers 906 comprise solid nutrients 908 separated from the inert substrate 902 a permeable membrane 914. The solid nutrients 908 may receive water from raw water nozzles 926 that traverse the lateral wall 916 entering the nutrient chambers 906. The inert substrate 902 may receive water from raw water nozzles 924 that traverse the lateral wall 916 entering growing area 932 and the growing area 930.

Figure 10:
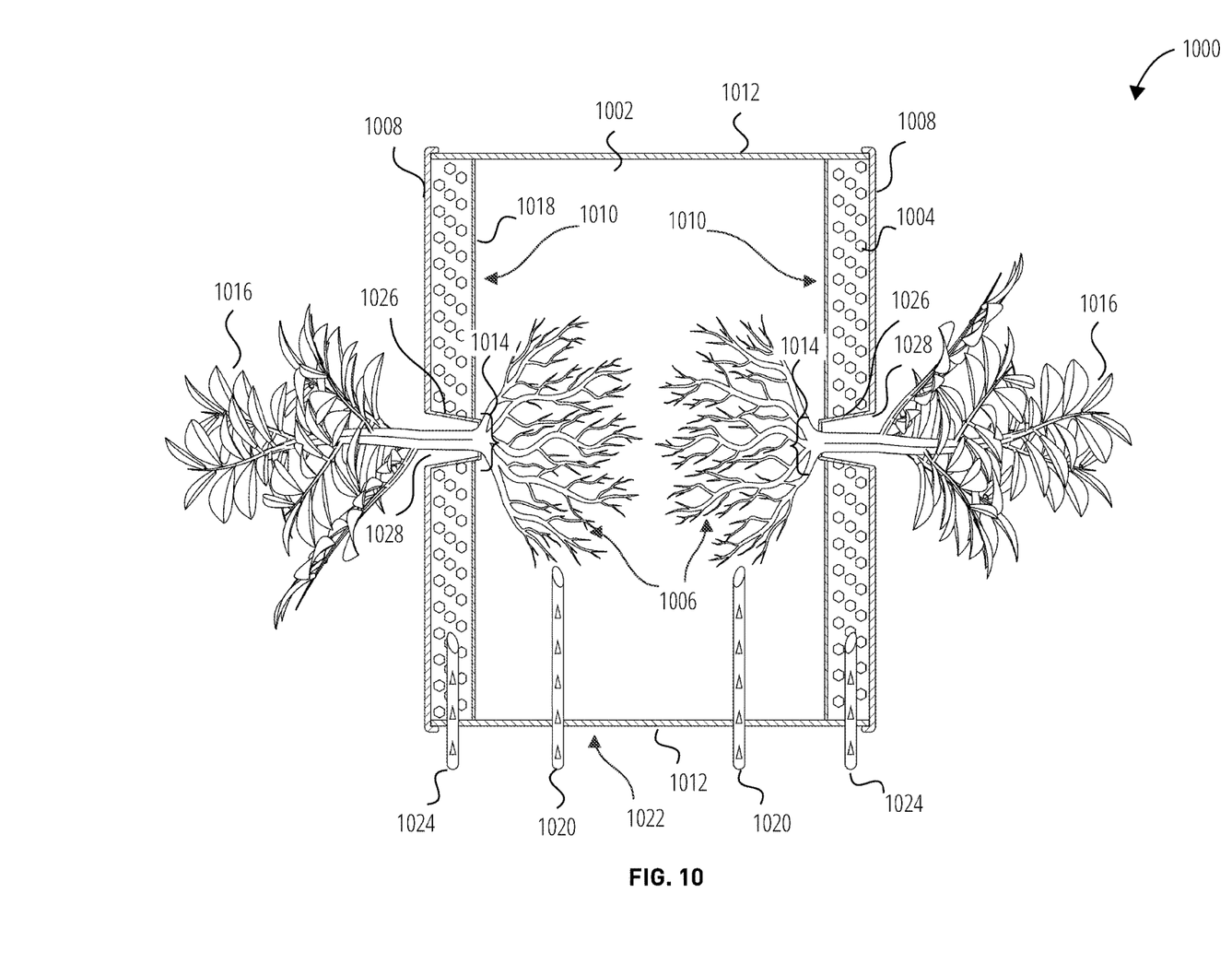
FIG. 10 illustrates a sectional view of a growing vessel 1000 in accordance with one embodiment.

FIG. 10 illustrates a sectional view of a growing vessel 1000 showing a dual sided vertical configuration of a growing vessel with nutrient chambers 1010 positioned adjacent to the covers 1008 on opposite ends. The growing vessel 1000 comprises an impervious outer vessel 1022 and two covers 1008. The impervious outer vessel 1022 comprises a lateral wall 1012, two nutrient chambers 1010, and inert substrate 1002. The lateral wall 1012 engages the covers 1008 enclosing the nutrient chambers 1010 and the inert substrate 1002. The nutrient chambers 1010 are positioned adjacent to the covers 1008. Each of the covers 1008 forms a seed pocket 1028 with a portion of the cover 1026 forming a barrier preventing solid nutrients 1004 from interacting with seeds or seedlings early in their growth. The seed pocket 1028 includes an aperture 1014 where seeds or seedlings may enter the inert substrate 1002 without contacting the solid nutrients 1004. Water may be provided to the solid nutrients 1004 in the nutrient chambers 1010 through raw water nozzles 1024 which traverse the lateral wall 1012 entering the nutrient chambers 1010. The inert substrate 1002 may be provided with water by the raw water nozzles 1020 that traverse the lateral wall 1012 to contact the inert substrate 1002. The solid nutrients 1004 are separated from the inert substrate 1002 through a permeable membrane 1018.

In the growing vessel 1000, two plants 1016 grow from the seed pocket 1028 through both of the covers 1008. The plants 1016 comprise roots growing in a root zone 1006 within the inert substrate 1002.

Figure 11:
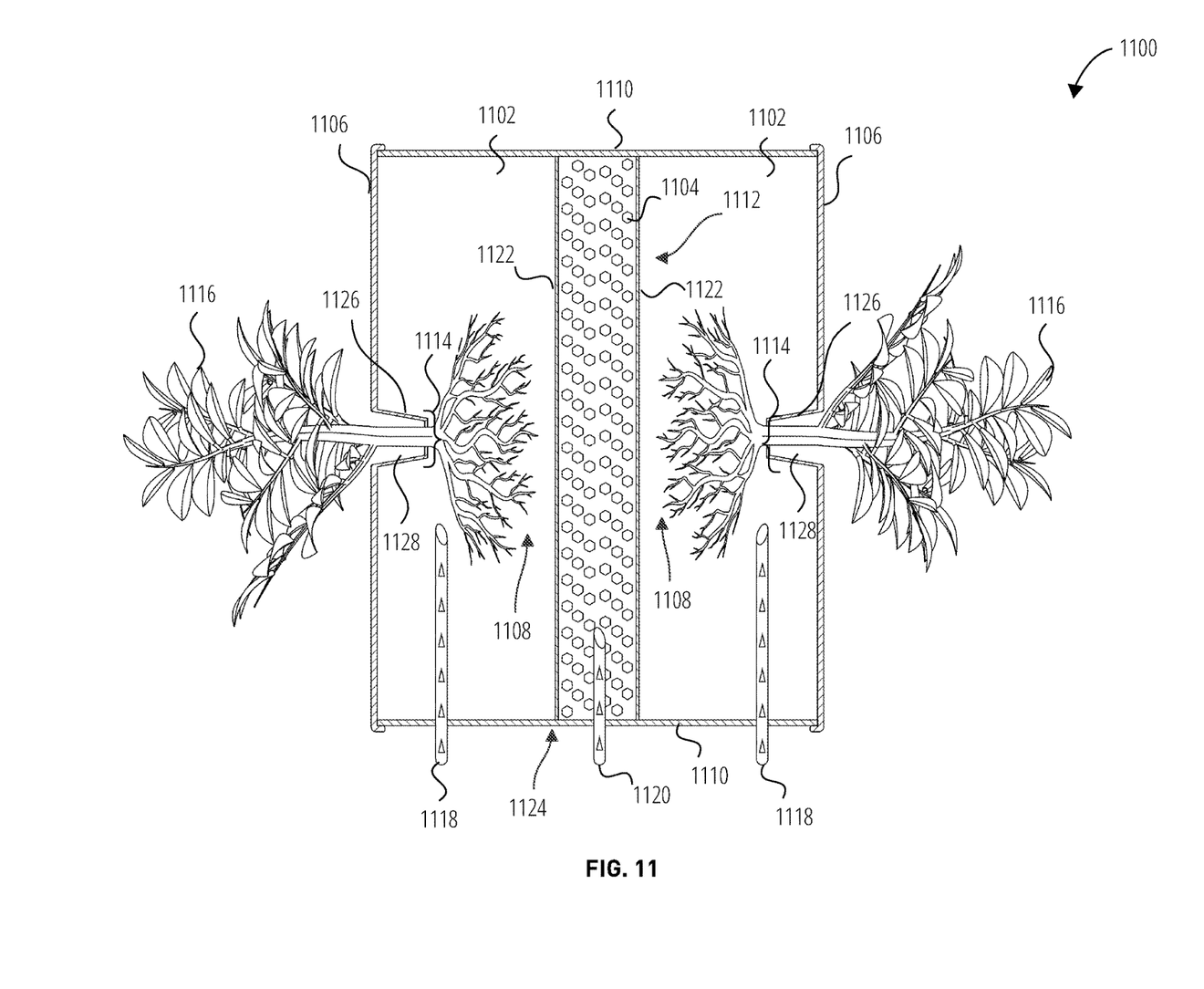
FIG. 11 illustrates a sectional view of a growing vessel 1100 in accordance with one embodiment.

FIG. 11 illustrates a sectional view of a growing vessel 1100 showing a dual sided vertical configuration of the growing vessel with a large nutrient chamber positioned between two regions containing the inert substrate. The growing vessel 1100 comprises an impervious outer vessel 1124 and two covers 1106. The impervious outer vessel 1124 comprises a lateral wall 1110, inert substrate 1102, and a nutrient chamber 1112. The lateral wall 1110 engages the covers 1106 to enclose the nutrient chamber 1112 and the inert substrate 1102. The nutrient chamber 1112 is positioned between layers of the inert substrate 1102. The covers 1106 form a seed pocket 1128 for receiving seeds or seedlings into the impervious outer vessel 1124. A portion of the cover 1126 surrounds the seed pocket 1128 and provides an aperture 1114 where seeds or seedlings may enter in contact with the inert substrate 1102. The nutrient chamber 1112 comprises solid nutrients 1104 separated from the inert substrate 1102 through a permeable membrane 1122. The inert substrate 1102 receive water from at least one raw water nozzle 1120 entering the nutrient chamber 1112 through the lateral wall 1110. The inert substrate 1102 may receive water from raw water nozzles 1118 that traverse lateral wall 1110.

In the growing vessel 1100, plants 1116 grow from the seed pocket 1128. The plants 1116 comprise roots growing in a root zone 1108 within the inert substrate 1102.

The methods, apparatuses, and systems in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments may not limit the extent of protection of this document.

Having thus described embodiments of the present invention of the present application in detail and by reference to illustrative embodiments thereof, it may be apparent that modifications and variations are possible without departing from the scope of the present invention.

What is claimed is:

1. A method of growing seeds or seedlings, comprising:
providing a growing vessel, the growing vessel including:
an impervious outer vessel including an inert substrate in a root zone;
a cover over the impervious outer vessel;
a first permeable membrane in contact with the inert substrate;
a nutrient chamber including solid nutrients, wherein the nutrient chamber is between the cover and the first permeable membrane or between the first permeable membrane and a bottom of the impervious outer vessel, and the solid nutrients are in contact with the first permeable membrane; and
a pocket allowing the seeds or seedlings access to the inert substrate through an aperture in the cover;
planting the seeds or seedlings in the pocket and in contact with the inert substrate;
injecting water into at least one of the nutrient chamber, the inert substrate, and combinations thereof; and
allowing shoots of plants to grow through the aperture.

2. The method of claim 1, wherein the water is injected by at least one nozzle into the nutrient chamber, and the at least one nozzle is inserted through the impervious outer vessel and through the permeable membrane.

3. The method of claim 1, wherein the water is injected by at least one nozzle into the nutrient chamber, and the at least one nozzle is inserted through the impervious outer vessel but not through the permeable membrane.

4. The method of claim 1, wherein the impervious outer vessel includes a base, vertically oriented walls, and a top rim.

5. The method of claim 4, wherein the cover is sealed to an edge of the top rim.

6. The method of claim 1, wherein the impervious outer vessel comprises at least one of plastic, cellulose, and polystyrene foam.

7. The method of claim 1, wherein the inert substrate is injected by at least one nozzle, and the at least one nozzle is inserted through the impervious outer vessel.

8. The method of claim 1, wherein the permeable membrane controls the amount of the water and the solid nutrients entering the inert substrate based on its permeability.

9. The method of claim 1, wherein the nutrient chamber is not in direct contact with the seeds or seedlings, plants, or the shoots of plants.

10. The method of claim 1, wherein a portion of the pocket proximate to the nutrient chamber is isolated from the nutrient chamber by a portion of the cover being sealed to the permeable membrane, such that the solid nutrients do not come in contact with the seeds or seedlings or shoots of plants.

11. The method of claim 1, further comprising a second permeable membrane, positioned above the first permeable membrane, in contact with the inert substrate, wherein the nutrient chamber is between the first permeable membrane and the second permeable membrane, and the solid nutrients are in contact with the first permeable membrane and the second permeable membrane.

12. A plant growing vessel comprising:
an impervious outer vessel including an inert substrate in a root zone;
a cover over the impervious outer vessel;
a first permeable membrane in contact with the inert substrate;
a nutrient chamber including solid nutrients, wherein the nutrient chamber is between the cover and the first permeable membrane or between the first permeable membrane and a bottom of the impervious outer vessel, and the solid nutrients are in contact with the first permeable membrane; and
a pocket allowing seeds or seedlings or shoots of plants access to the inert substrate through an aperture in the cover.

13. The plant growing vessel of claim 12, further comprising a second permeable membrane, positioned above the first permeable membrane, in contact with the inert substrate, wherein the nutrient chamber is between the first permeable membrane and the second permeable membrane, and the solid nutrients are in contact with the first permeable membrane and the second permeable membrane.

14. The plant growing vessel of claim 12, wherein the impervious outer vessel includes a base, vertically oriented walls, and a top rim.

15. The plant growing vessel of claim 14, wherein the cover is sealed to an edge of the top rim.

16. The plant growing vessel of claim 12, wherein the impervious outer vessel comprises at least one of plastic, cellulose, and polystyrene foam.

17. The plant growing vessel of claim 12, wherein the permeable membrane controls the amount of water and the solid nutrients entering the inert substrate based on the inert substrate permeability.

18. The plant growing vessel of claim 12, wherein the nutrient chamber is not in direct contact with the seeds or seedlings, or the shoots of plants.

19. The plant growing vessel of claim 12, wherein a portion of the pocket proximate to the nutrient chamber is isolated from the nutrient chamber by a portion of the cover being sealed to the permeable membrane, such that the solid nutrients do not come in contact with the seeds or seedlings or shoots of plants.

20. A plant growing vessel comprising:
an impervious outer vessel including an inert substrate in a root zone;
a cover over the impervious outer vessel;
a first permeable membrane in contact with the inert substrate;
a nutrient chamber including solid nutrients, wherein the nutrient chamber is between a wall of the impervious outer vessel and the first permeable membrane, and the solid nutrients are in contact with the first permeable membrane; and
a pocket allowing seeds or seedlings, or shoots of plants access to the inert substrate through an aperture in the cover.

* * * * *